US007034079B2

(12) United States Patent
Visger et al.

(10) Patent No.: US 7,034,079 B2
(45) Date of Patent: *Apr. 25, 2006

(54) RADIAL POLYMERS PREPARED BY STABILIZED FREE RADICAL POLYMERIZATION

(75) Inventors: Daniel C. Visger, Mentor, OH (US); Richard M. Lange, Euclid, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 564 days.

This patent is subject to a terminal disclaimer.

(21) Appl. No.: 10/101,672

(22) Filed: Mar. 19, 2002

(65) Prior Publication Data

US 2002/0147118 A1 Oct. 10, 2002

Related U.S. Application Data

(63) Continuation of application No. 09/582,147, filed as application No. PCT/US99/24706 on Oct. 20, 1999, now Pat. No. 6,369,162.

(51) Int. Cl.
*C08F 281/00* (2006.01)

(52) U.S. Cl. ...................... 525/260; 508/232; 508/591; 525/263

(58) Field of Classification Search ............... 525/260, 525/263; 508/232, 591
See application file for complete search history.

(56) References Cited

U.S. PATENT DOCUMENTS

| 3,189,663 | A | | 6/1965 | Nozaki ................... 260/879 |
| 3,985,830 | A | * | 10/1976 | Fetters ................... 260/880 |
| 4,108,945 | A | * | 8/1978 | Fetters ................... 260/880 |
| 4,136,047 | A | | 1/1979 | Rogan et al. ............ 252/56 R |
| 4,180,530 | A | | 12/1979 | Bi et al. ................ 525/98 |
| 4,581,429 | A | | 4/1986 | Solomon et al. ......... 526/220 |
| 5,059,641 | A | * | 10/1991 | Hayes ................... 523/456 |
| 5,194,510 | A | | 3/1993 | DuBois .................. 525/299 |
| 5,225,491 | A | * | 7/1993 | Yu ....................... 525/213 |
| 5,312,871 | A | | 5/1994 | Mardare et al. ......... 525/272 |
| 5,322,912 | A | | 6/1994 | Georges et al. ......... 526/204 |
| 5,371,149 | A | | 12/1994 | Kishida et al. ......... 525/309 |
| 5,401,804 | A | | 3/1995 | Georges et al. ......... 525/267 |
| 5,412,047 | A | | 5/1995 | Georges et al. ......... 526/204 |
| 5,449,724 | A | | 9/1995 | Moffat et al. .......... 526/204 |
| 5,496,898 | A | | 3/1996 | Sutherland et al. ...... 525/299 |
| 5,498,679 | A | | 3/1996 | Moffat et al. .......... 526/204 |
| 5,530,079 | A | | 6/1996 | Veregin et al. ......... 526/219.3 |
| 5,552,502 | A | | 9/1996 | Odell et al. ........... 526/234 |
| 5,608,023 | A | | 3/1997 | Odell et al. ........... 526/225 |
| 5,616,542 | A | * | 4/1997 | Sutherland ............. 508/207 |
| 5,627,248 | A | | 5/1997 | Koster et al. .......... 526/217 |
| 5,677,388 | A | | 10/1997 | Koster et al. .......... 525/314 |
| 5,679,762 | A | | 10/1997 | Yoshida et al. ......... 528/364 |
| 5,721,320 | A | | 2/1998 | Priddy et al. .......... 525/316 |
| 5,723,511 | A | | 3/1998 | Kazmaier et al. ........ 525/35 |
| 5,728,747 | A | | 3/1998 | Kazmaier et al. ........ 522/11 |
| 5,733,980 | A | * | 3/1998 | Cozewith ............... 525/314 |
| 5,849,847 | A | * | 12/1998 | Quirk .................. 525/193 |
| 6,034,042 | A | * | 3/2000 | Rhodes ................. 508/591 |
| 6,083,888 | A | * | 7/2000 | Sutherland ............. 508/221 |
| 6,197,891 | B1 | * | 3/2001 | Schwindeman .......... 525/332.9 |

FOREIGN PATENT DOCUMENTS

| DE | 43 28 004 A1 | 2/1995 |
| DE | 197 04 714 A1 | 7/1997 |
| EP | 0 780 733 A1 | 6/1997 |
| EP | 0 819 755 A2 | 1/1998 |
| EP | 0 887 362 A1 | 12/1998 |
| WO | WO 92/07014 | 4/1992 |
| WO | WO 94/11412 | 5/1994 |
| WO | WO 95/31484 | 11/1995 |

OTHER PUBLICATIONS

Derwent Abstract 1995-091744.
Derwent Abstract 1997-386778.

* cited by examiner

*Primary Examiner*—Edward J. Cain
(74) *Attorney, Agent, or Firm*—David M. Shold; Michael F. Esposito

(57) ABSTRACT

A process for preparing a radial polymer comprising at least 3 polymeric arms and a central core comprising a polymerized di- or polyfunctional monomer, said process comprising the steps, (a) polymerizing at an elevated temperature, a charge comprising at least one free radical-polymerizable monomer to prepare a stabilized active polymer block (A) using a free radical polymerization process,
wherein a stable free radical agent is employed during the polymerization, thereby preserving the stabilized active polymerization site at the terminus of the polymer; optionally
(b) adding at least one additional free radical-polymerizable monomer, at least one of which is different from the monomers making up the first charge of monomers, to the stabilized active polymer block (A); and further reacting the mixture using a free radical process to effect copolymerization of said monomers, thereby preparing an A-B block copolymer having a stabilized active polymerization site at the terminus of the polymer; then
(c) adding at least one coupling agent comprising a polyfunctional monomer and reacting the stabilized active polymers from (a) or (b) with a coupling agent to form a radial polymer.

The present invention also relates to polymers, including block copolymers prepared by the above process, additive concentrates for preparing lubricating oil compositions and lubricating oil compositions. In other embodiments, the present invention relates to block copolymers having more than two blocks.

14 Claims, No Drawings

RADIAL POLYMERS PREPARED BY STABILIZED FREE RADICAL POLYMERIZATION

This is a continuation of Ser. No. 09/582,147 filed Jun. 21, 2000, now U.S. Pat. No. 6,369,162, which is a 371 of PCT/US99/24706 filed Oct. 20, 1999.

FIELD OF THE INVENTION

The present invention relates to a free radical process for preparing radial polymers, radial polymers prepared by the process, additive concentrates and lubricating oil compositions.

BACKGROUND OF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers. Many viscosity improvers are block copolymers.

Dispersants are also well-known in the lubricating art. Dispersants are employed in lubricants to keep impurities, particularly those formed during operation of mechanical devices such as internal combustion engines, automatic transmissions, etc. in suspension rather than allowing them to deposit as sludge or other deposits on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp. (1978), pp 139–164; and M. W. Ranney, "Synthetic Oils and Additives for Lubricants", Noyes Data Corp. (1980), pp 96–166. Each of these publications is hereby expressly incorporated herein by reference.

Dispersant-viscosity improvers are generally prepared by functionalizing, i.e., adding polar groups, to a hydrocarbon polymer backbone.

Hayashi, et al, U.S. Pat. No. 4,670,173 relates to compositions suitable for use as dispersant-viscosity improvers made by reacting an acylating reaction product which is formed by reacting a hydrogenated block copolymer and an alpha-beta olefinically unsaturated reagent in the presence of free-radical initiators, then reacting the acylating product with a primary amine and optionally with a polyamine and a mono-functional acid.

Chung et al, U.S. Pat. No. 5,035,821 relates to viscosity index improver-dispersants comprised of the reaction products of an ethylene copolymer grafted with ethylenically unsaturated carboxylic acid moieties, a polyamine having two or more primary amino groups or polyol and a high functionality long chain hydrocarbyl substituted dicarboxylic acid or anhydride.

Van Zon et al, U.S. Pat. No. 5,049,294, relates to dispersant/VI improvers produced by reacting an alpha, beta-unsaturated carboxylic acid with a selectively hydrogenated star-shaped polymer then reacting the product so formed with a long chain alkane-substituted carboxylic acid and with a $C_1$ to $C_{18}$ amine containing 1 to 8 nitrogen atoms and/or with an alkane polyol having at least two hydroxy groups or with the performed product thereof.

Bloch et al, U.S. Pat. No. 4,517,104, relates to oil soluble viscosity improving ethylene copolymers reacted or grafted with ethylenically unsaturated carboxylic acid moieties then with polyamines having two or more primary amine groups and a carboxylic acid component or the preformed reaction product thereof.

Gutierrez et al, U.S. Pat. No. 4,632,769, describes oil-soluble viscosity improving ethylene copolymers reacted or grafted with ethylenically unsaturated carboxylic acid moieties and reacted with polyamines having two or more primary amine groups and a $C_{22}$ to $C_{28}$ olefin carboxylic acid component.

Each of these patents is hereby expressly incorporated herein by reference.

For additional disclosures concerning multi-purpose additives and particularly viscosity improvers and dispersants, the disclosures of the following United States patents are incorporated herein by reference:

| | | |
|---|---|---|
| 2,973,344 | 3,488,049 | 3,799,877 |
| 3,278,550 | 3,513,095 | 3,842,010 |
| 3,311,558 | 3,563,960 | 3,864,098 |
| 3,312,619 | 3,598,738 | 3,864,268 |
| 3,326,804 | 3,615,288 | 3,879,304 |
| 3,403,011 | 3,637,610 | 4,033,889 |
| 3,404,091 | 3,652,239 | 4,051,048 |
| 3,445,389 | 3,687,849 | 4,234,435 |

U.S. Pat. No. 5,530,079, Veregin et al., discloses a polymerization process comprising heating a mixture of a free radical initiator, a stable free radical agent, at least one polymerizable monomer compound, and optionally a solvent.

U.S. Pat. No. 5,401,804, Georges et al., discloses a free radical polymerization process comprising heating a mixture of a free radical initiator, a stable free radical agent, and at least one polymerizable monomer. The stable free radical agent includes nitroxide free radicals. An organic sulfonic or carboxylic acid can be added to increase the rate of polymerization.

U.S. Pat. No. 3,189,663, Nozaki, discloses block copolymers comprising copolymers where the macromolecules are made up of at least two different linear segments. The first is made up of a linear polymer of a member of the group consisting of ethylenically unsaturated carboxylic acids, anhydrides thereof, and their esters and amides. The second segment is made up of a polymer of a dissimilar member of the first group, esters of unsaturated alcohols and saturated acids, alkenes, alkadienes, vinyl halides, vinyl substituted aromatic hydrocarbons, alkenyl-substituted halo-hydrocarbons, and alkenyl ethers.

U.S. Pat. No. 4,581,429, Solomon et al., discloses a process for free radical polymerization to produce relatively short chain length homo- and copolymers. The initiator has the general formula

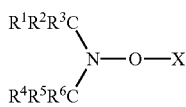

U.S. Pat. No. 5,608,023, Odell et al., discloses a polymerization process comprising heating a mixture of a free radical initiator, a stable free radical agent, at least one polymerizable monomer compound, and a sulfonic acid salt polymerization rate enhancing compound to form thermoplastic resins.

U.S. Pat. No. 5,449,724, Moffatt et al., discloses a free radical polymerization process which includes heating a mixture comprised of a free radical initiator, a stable free radical agent, and ethylene.

U.S. Pat. No. 5,677,388, Koster et al., relates to a living free-radical polymerization process for preparing polymers from vinyl aromatic monomers comprising polymerizing the vinyl aromatic monomer in the presence of a difunctional nitroxyl initiator.

U.S. Pat. No. 4,180,530, Bi et al., describe star-block copolymers containing 60 to 95 percent by weight of a monovinyl aromatic compound and 40 to 5 percent by weight of a conjugated diene having 4 to 8 carbon atoms. The copolymers have the general formula $(A-A'/B-B')_m-X-(B'-B/A')_n$ where A is a non-elastomeric polymer segment based on 80 to 90 percent by weight of the total monovinyl aromatic compound, B/A' or A'B is an elastomeric copolymer segment based on a random copolymer of the monovinyl aromatic compound and the conjugated diene, B' is an elastomeric segment of poly (conjugated diene) containing 20–40 percent by weight of the total conjugated diene, m and n are integers whose sum is between 3 and 20, and X is the radical of a polyfunctional coupling agent forming the nucleus of the star-block copolymer. These are prepared by a four-stage process of anionic polymerization.

U.S. Pat. No. 5,496,898, Sutherland et al., describe star polymers prepared by an anionic process having polymeric arms of a hydrogenated conjugated diene and substantially smaller polymeric arms of a methacrylate used as viscosity improvers. Methacrylate groups can be converted to amide or imide groups by reaction with primary or secondary amine to afford dispersant properties.

U.S. Pat. No. 5,723,511, Kazmaier et al., describes a process for the preparation of branched thermoplastic resins comprising: heating a mixture of a free radical initiator, at least one first free radical reactive monomer, at least one free radical reactive branching agent compound, and at least one stable free radical agent, to produce a linear or unbranched polymer product with a free radical initiator fragment at one end and a covalently bonded stable free radical agent at the other end of the polymerized chain of monomers; and irradiating the unbranched polymer product in the presence of a reactive compound selected from the group consisting of a free radical reactive monomer, a branching agent compound, and mixtures thereof to form a branched polymeric product.

Rhodes et al. in U.S. Pat. No. 5,460,739, describes star polymers which can be used as viscosity index improvers in oil compositions. The star polymers are made by an anionic process, and have triblock copolymer arms of hydrogenated polyisoprene-polybutadiene-polyisoprene.

Rhodes et al., in U.S. Pat. No. 5,458,791, describes star polymers used as viscosity index improvers in oil compositions formulated for high performance engines. The star polymers have specific triblock copolymer arms of hydrogenated polyisoprene-polystyrene-polyisoprene.

Storey et al. in U.S. Pat. No. 5,458,796, relates to the synthesis of star polymers containing polyisobutylene (PIB) via the arm-first, core-last method by a cationic process. These star polymers are used as viscosifiers for lubricating oils due to their inherent lack of unsaturation and their relatively flat temperature/viscosity profiles.

An object of this invention is to provide a novel process for preparing radial polymers.

Another object is to provide a one-pot, relatively short duration process for preparing radial polymers.

Another object is to provide radial polymers which may be isolated as diluent-free, dry, free-flowing solids.

Another object of this invention is to provide novel radial polymers useful as lubricant additives.

Still another object is to provide lubricants having improved shear stability and viscometric properties.

A more specific object is to provide additives directed to improving lubricant viscometrics.

Another object is to provide viscosity improvers having high thickening efficiency.

Other objects will in part be obvious in view of this disclosure and will in part appear hereinafter.

SUMMARY OF THE INVENTION

The present invention provides a process for preparing radial polymers comprising at least 3 polymeric arms and a central core comprising a polymerized di- or polyfunctional monomer, said process comprising the steps, (a) polymerizing at an elevated temperature, a charge comprising at least one free radical-polymerizable monomer to prepare a stabilized active polymer block (A) using a free radical polymerization process, wherein a stable free radical agent is employed during the polymerization, thereby preserving the stabilized active polymerization site at the terminus of the polymer; optionally (b) adding at least one additional free radical-polymerizable monomer, at least one of which is different from the monomers making up the first charge of monomers, to the stabilized active polymer block (A); and further reacting the mixture using a free radical process to effect copolymerization of said monomers, thereby preparing an A-B block copolymer having a stabilized active polymerization site at the terminus of the polymer; then (c) adding at least one coupling agent comprising a polyfunctional monomer and reacting the stabilized active polymers from (a) or (b) with the coupling agent to form a radial polymer.

The present invention also relates to radial polymers, including radial block copolymers prepared by the above process, additive concentrates for preparing lubricating oil compositions and lubricating oil compositions. In other embodiments, the present invention relates to radial block copolymers having more than two blocks.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms provided that they do not adversely affect reactivity or utility of the process or products of this invention.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated into a lubricating oil. For a further discussion of the terms oil soluble and dispersible, particularly "stably dispersible", see U.S. Pat. No. 4,320,019 which is expressly incorporated herein by reference for relevant teachings in this regard.

The expression "lower" is used throughout the specification and claims. As used herein to describe various groups, the expression "lower" is intended to mean groups containing no more than 7 carbon atoms, more often, no more than 4, frequently one or two carbon atoms.

It must be noted that as used in this specification and appended claims, the singular forms also include the plural unless the context clearly dictates otherwise. Thus the singular forms "a", "an", and "the" include the plural; for example "a monomer" includes mixtures of monomers of the same type. As another example the singular form "monomer" is intended to include both singular and plural unless the context clearly indicates otherwise.

Thickening efficiency (abbreviated herein as "TE") is defined herein as a measure of the thickening power of a polymeric viscosity improver in a given base oil. It is expressed a the difference of the logarithm of the viscosity at 100° in centistokes of the polymer containing lubricant and the logarithm of the viscosity at 100° in centistokes of the base oil alone, divided by the concentration (as a decimal fraction) of the polymer in the lubricant.

In the context of this invention the term "polymer" refers to a polymer of any type including homopolymers and copolymers. The term "copolymer"means a polymer derived from two or more different monomers. Thus, a polymer derived from a mixture of, for example, methyl-, butyl-, $C_{9-11}$-, and $C_{12-18}$-methacrylates, or a polymer having two or more distinct blocks, is a copolymer as defined herein. The polymers of this invention also may contain units derived from nitrogen-containing monomers.

The expression "substantially inert" is used in reference to diluents. When used in this context, "substantially inert" means the diluent is essentially inert with respect to any reactants or compositions of this invention, that is, it will not, under ordinary circumstances, undergo any significant reaction with any reactant or composition, nor will it interfere with any reaction or composition of this invention.

The expression viscosity index (often abbreviated VI), is frequently used herein. Viscosity index is an empirical number indicating the degree of change in viscosity within a given temperature range. A high VI signifies an oil that displays a relatively small change in viscosity with temperature.

The polymers of this invention may be derived from a wide variety of monomers including styrene and substituted styrenes, $\alpha,\beta$-unsaturated carboxylic acids, for example maleic, fumaric, itaconic, acrylic, methacrylic, cyanoacrylic, and esters, anhydrides, and amides thereof, and free radical polymerizable olefins and conjugated dienes. Especially preferred monomers are vinyl substituted aromatic compounds and acrylic monomers as described in greater detail hereinbelow.

As noted above, the radial polymers of the invention are prepared by first generating stabilized polymers which are further reacted with a coupling agent to form a radial polymer. Thus, the stabilized polymers become the arms of the radial polymer.

The radial polymer will contain at least 3 polymeric arms, often from 3 to about 10 and typically from 5 to about 8 arms. Generally, the radial polymers of this invention contain no more than 15, more often no more than 10, and usually no more than 8 polymeric arms.

The arms of the radial polymer may be essentially identical or may comprise different compositions.

As noted above, each polymeric arm may be a homopolymer or a copolymer. When the arm is copolymeric, it is often a block copolymer but may be a random or alternating copolymer.

Homopolymeric arms are prepared according to step (a) of the above-described process, wherein a single monomer is employed.

Copolymeric arms may be generated by the process employing only step (a) wherein two or more monomers are polymerized simultaneously forming, for example, statistical copolymers, alternating copolymers, etc.

Copolymeric arms which are block copolymers are prepared according to the procedure wherein both steps (a) and (b) are employed, i.e., they are A-B block copolymers.

Copolymeric arms may also be tri- and higher-block copolymers.

A-B-A block copolymers may be prepared by incorporating an additional A-block by (e) after step (b) and before step (c), adding and polymerizing, at an elevated temperature, at least one additional monomer wherein said additional monomer has the same composition as that charged to generate block A.

A C-block may be incorporated by (f) after step (b) and before step (c) adding and polymerizing at an elevated temperature, at least one free radical-polymerizable monomer wherein the composition of the monomer is different from the monomers employed in steps (a)(b).

Higher block copolymers may be prepared by analogous means.

The Vinyl Aromatic Monomer

In the present invention one of the monomers may be a vinyl substituted aromatic compound The vinyl substituted aromatics generally contain from 8 to about 20 carbons, preferably from 8 to 12 carbon atoms and most preferably, 8 or 9 carbon atoms. Heterocyclic compounds having, for example sulfur, oxygen or nitrogen ring heteroatoms, such as vinyl pyridines are contemplated.

Examples of vinyl substituted aromatics include vinyl anthracenes, vinyl naphthalenes and vinyl benzenes (styrenes) including substituted styrenes. Substituted styrenes include styrenes that have substituents on the ring or on the vinyl group. Such substituents include halo-, amino-, alkoxy-, carboxy-, hydroxy-, sulfonyl-, hydrocarbyl-wherein the hydrocarbyl group has from 1 to about 12 carbon atoms, and other substituents. Examples of styrenes include styrene, alpha-lower alkyl substituted styrene, for example, alpha-methyl styrene and alpha-ethyl styrene, styrenes having ring substituents, preferably, lower alkyl ring substituents, for example, ortho-methyl styrene, meta-methyl styrene, para-methyl styrene, and para-tertiary-butyl-styrene, vinyl benzene sulfonic acid, and para-lower alkoxy styrene. Mixtures of two or more vinyl aromatic monomers can be used. Styrene and substituted styrenes are preferred.

The Acrylic Monomer

As used herein the term "acrylic monomer" includes acrylic acids, esters of acrylic acids, acrylic amides, and acrylonitriles and the corresponding alkacryl-, especially methacryl-, compounds, particularly alkyl methacrylates, methacrylamides, and methacrylonitrile. The esters of acrylic acids typically contain from 2 to about 50 carbon atoms in the ester group, which ester group includes the carbonyl carbon atom. Often, the ester groups are lower alkyl esters, wherein the expression "lower alkyl" means alkyl groups having no more than 7 carbon atoms, preferably from 1 to about 4 carbons. In another preferred embodiment, the ester group contains from 2 to about 30 carbon atoms, preferably from about 9 to about 23 carbon atoms, often from about 8 to about 18 carbon atoms. In an especially preferred embodiment, the ester group contains a mixture of alkyl groups, such as from about 9 to about 11 carbon atoms or from about 13 to about 16 carbon atoms.

Examples of useful acrylic monomers include acrylic acid, methacrylic acid, esters thereof, including lower alkyl esters, fatty esters, and mixed esters, such as $C_{8-10}$ alkyl esters and $C_{12-15}$ alkyl esters, acrylamide, methacrylamide, and N- and N,N-substituted acrylamides and the corresponding methacrylamides, acrylonitrile and methacrylonitrile.

Also included among "acrylic" monomers are α,β-unsaturated polycarboxylic monomers such as maleic acid, esters thereof, amides, amidic acids and esters thereof, and the corresponding fumaric compounds.

Stable Free Radical Agent

Stable free radical agents are known. Suitable stable free radical agents include phenoxy radicals and nitroxy radicals. Examples of phenoxy radicals include phenoxy radicals substituted in the 2 and 6 positions by bulky groups such as tert-alkyl (e.g., t-butyl), phenyl, or dimethylbenzyl, and optionally substituted at the 4 position by an alkyl, alkoxyl, aryl, or aryloxy group or by a heteroatom containing group (e.g., S, N, or O) such as a dimethylamino or diphenylamino group, and materials which contain two or more such aromatic rings bridged at, e.g., the 4 position. Thiophenoxy radical analogs of such phenoxy radicals are also contemplated. Typical stable nitroxy radicals are those having the general formula $R_1R_2N$—O., where $R_1$ and $R_2$ are tertiary alkyl groups, or where $R_1$ and $R_2$ together with the N atom form a cyclic structure, preferably having tertiary branching at the positions alpha to the N atom. Examples of hindered nitroxy radicals include 2,2,5,5-tetraalkylpyrrolidinoxyl radicals, as well as those in which the 5-membered heterocycle ring is fused to an alicyclic or aromatic ring, hindered aliphatic dialkylaminoxyl and iminoxyl radicals such as $(R_3C)_2N$—O. and $R_2CN$—O., diarylaminoxyl and aryl-alkylaminoxyl radicals such as the nitroxyl radical from alkyl diphenylamine, (R—Ar)$_2$N—O., nitroxyl derivatives of dihydroquinoline light stabilizers and antiozonants (available from Ciba-Geigy), in monomeric and polymeric forms, and nitroxyl radicals derived from dibenzo-heterocycles such as phenothiazines and phenoxazines. A specific, preferred example is 2,2,6,6-tetramethyl-1-piperidinyloxy, which is available from Aldrich Chemical Company under the trade name TEMPO™. This material is understood to be a representative of materials of the general structure

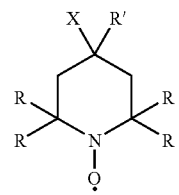

Where each R is independently alkyl or aryl, R' is hydrogen, alkyl, or aryl, X is hydrogen, alkyl, aryl, alkoxyl, carbalkoxy, carboxyalkyl, carboxamido- (—NHC(O)—lower alkyl), or chloro, or where R' is absent and X is =O, =N, or =S. Esters and ethers thereof are also contemplated.

Hindered amine stabilizers are described in detail in Polymer Stabilization and Degradation, P. P. Klemchuk, Editor, American Chemical Society, Symposium Series 280, 1985, pages 55–97. These materials are closely related structurally to nitroxy radicals and can be converted thereinto by known means. Accordingly, the hindered amine structures illustrated in particular on pages 56, 58, 61, 91, 92, 94, 95, 97, and 97 of the above-cited document can be taken as illustrative of characteristic structures of a variety of stable nitroxy radicals.

The amount of stable free radical agent employed in the polymerization of the first block is typically 0.001 to 0.01 moles per mole of monomer, particularly for polymer molecular weights in the range of 10,000 to 100,000. Specific amounts can readily be determined and appropriately adjusted by the person skilled in the art.

Free Radical Initiators

Free radical initiators include peroxy compounds, peroxides, hydroperoxides, and azo compounds which decompose thermally to provide free radicals.

Free radical generating reagents are well know to those skilled in the art. Examples include benzoyl peroxide, t-butyl perbenzoate, t-butyl metachloroperbenzoate, t-butyl peroxide, sec-butylperoxydicarbonate, azobisisobutyronitrile, and the like. Numerous examples of free radical-generating reagents, also known as free-radical initiators, are mentioned in the above-referenced texts by Flory and by Bovey and Winslow. An extensive listing of free-radical initiators appears in J. Brandrup and E. H. Immergut, Editor, "Polymer Handbook", 2nd edition, John Wiley and Sons, New York (1975), pages II-1 to II-40. Preferred free radical-generating reagents include t-butyl peroxide, t-butyl hydroperoxide, t-amyl peroxide, cumyl peroxide, t-butyl peroctoate, t-butyl-m-chloroperbenzoate and azobisisovaleronitrile.

The free radical initiators are generally used in an amount from 0.01 to about 10 percent by weight based on the total weight of the reactants. Preferably, the initiators are used at about 0.05 to about 2 percent by weight. The molar ratio of free radical initiator to stable free radical agent is from about 0.2 to about 2:1, preferably from about 0.8:1 to about 1.2:1, even more often from about 1.1 to 1.2:1, frequently 0.8–0.9: 1.

The reaction is usually conducted at temperatures ranging between about 80° C. to about 200° C., preferably between about 130° C. to about 170° C. Considerations for determining reaction temperatures include reactivity of the system and the half-life of the initiator at a particular temperature.

The choice of free radical generating reagent can be an important consideration. For example, when the reaction is conducted with a solvent such as a hydrocarbon oil, grafting of monomer onto the oil diluent may occur. It has been observed that the choice of initiator affects the extent of grafting of the monomer onto the oil diluent. Reducing the amount of monomer grafted onto the diluent usually results in an increased amount of monomer incorporated into the polymer block.

Promoter

To further facilitate the polymerization, the polymerization can be conducted in the presence of a strong acid or an amine salt of an acid in an amount suitable to enhance the rate of polymerization, that is to say, a catalytic amount. Such an acid will normally have a pKa as measured in water of less than 4, preferably less than 2.5, and more preferably less than 2. A preferred amount of the acid or amine salt is an amount sufficient to reduce the pH of the reaction medium to 4 to 5. Otherwise stated, the ratio of an organic acid to the amount of the sterically hindered stable free radical is preferably about 1:1 to about 1:20, often to about 1:11 by weight. Either organic or inorganic acids can be used, for example mineral acids, sulfonic acids, acidic clays, organic sulfonic acids, carboxylic acids, acidic salts of any of these acids, and monoesters of sulfurous- and sulfuric acids. Preferred acids include carboxylic acids, sulfonic acids, phosphonic acids, and phosphoric acids. One such acid which has been successfully employed in the past is camphorsulfonic acid. See, for instance, U.S. Pat. No. 5,401,804. Other feasible acids include methane sulfonic acid, toluene sulfonic acid, sulfonic acid functionalized resins, 2-fluoro-1-methylpyridinium p-toluenesulfonate, trifluoromethanesulfonic acid, 3,5-di-t-butyl-4-hydroxybenzenesulfonic acid, and pyridinium p-toluenesulfonate.

The medium for polymerization is not particularly critical and can be any such medium in which polymerization can be effected. Alternatively, polymerization can be conducted in the substantial absence of medium or solvent, that is, neat. Preferably, the medium is one in which the reactants are soluble, often a substantially inert normally liquid organic diluent. Examples include alkyl aromatics, preferably in relatively small amounts so that a relatively high concentration of monomer can be maintained. If such a medium is used, it should also be one from which an initially formed block can be separated, such as by filtration, precipitation into a nonsolvent, or evaporation of the medium. Thus, a first block can be isolated prior to the further reaction to prepare a second block, while retaining the active polymerization site thereon. This retention of the active polymerization site is a characteristic and a benefit of the use of the stabilized free radical initiator. Solvents which readily transfer hydrogen atoms under radical conditions are preferably avoided. For best results in retaining the active polymerization site, processing of the polymer in the presence of hydrogen atom transfer agents, particularly at elevated temperatures, should be avoided.

Alternatively, the process to prepare subsequent blocks may be conducted without isolation of the preceding block.

The polymerization of monomers to prepare a second block can be accomplished either with or without employing additional free radical initiator and or promoter. Often, additional promoter or initiator is beneficial, and sometimes is necessary, to enable polymerization of the second block to proceed, especially at an acceptable rate.

In the process to prepare an A-B block copolymer, the weight ratio of a first monomer to a second, different, monomer, typically ranges from about 20:1 to about 1:20, preferably, from about 5:1 to about 1:10, most preferably from about 35:65 to about 65:35.

In the process of this invention to prepare arms having A-B block configuration, from about 5 to about 95 mole % of the charge comprising the at least one free radical polymerizable monomer, preferably, from about 50 to about 80 mole %, is polymerized to prepare the stabilized active polymer block (A). To the mixture of A-block polymer and unreacted monomer is then added the at least one additional free radical polymerizable monomer, at least one of which is different from the monomers making up the first charge of monomers, which is then further reacted to form a (B) block. Optionally, additional free radical initiator and/or promoter may be utilized.

The polymerization process may be halted by (d) reducing the temperature below the polymerization temperature of the monomers. The polymer may then be further worked up and isolated as a substantially solvent free dry polymer by stripping off diluent, if any, and volatile unreacted monomer, or by precipitation of the polymer from a solvent in which the polymer has limited solubility, and which solvent selectively takes up unreacted monomer.

Additional blocks may be incorporated into the polymeric arms of this invention.

In one embodiment, an additional (A) block is made up of the same monomers employed to generate the first block, block (A). The additional block is incorporated by (e) after step (b) and before step (c), adding and polymerizing, at an elevated temperature, at least one additional vinyl aromatic monomer wherein said additional vinyl aromatic monomer has the same composition as that charged to generate block A. In this embodiment, the amount of monomers charged to generate the additional block ranges from about 0.2 to about 5 times that used to prepare the first (A) block. The additional monomer is charged and polymerized, optionally with additional free-radical initiator, in the same fashion as the preparation of the (B) block. The resulting polymer is an A-B-A triblock polymer.

In another embodiment, the additional block is a (C) block made up of monomers wherein the composition of the third monomers is different from those employed in steps (a) and) (b) to generate the (A) and (B) blocks. This additional block is incorporated by (f) after step (b) and before step (c) adding and polymerizing at an elevated temperature, at least one free radical polymerizable monomer wherein the composition of the third monomer is different from the monomers employed in steps (a)–(b). The additional monomers are charged and polymerized, optionally with additional free-radical initiator. The resulting polymer is an A-B-C triblock polymer. The weight ratio of the monomers charged to prepare the additional block to the total weight of monomers charged to prepare the (A) and (B) blocks ranges from about 1:5 to about 10:1.

In a preferred embodiment, the monomers are at least one of vinyl aromatic monomers and acrylic monomers. The vinyl aromatic monomer is preferably selected from the group consisting of styrenes comprising at least one of styrene, an α- lower alkyl substituted styrene, vinyl benzene sulfonic acid, and styrenes having C1–4 alkyl ring substituents, and the acrylic monomer is preferably selected from the group consisting of acrylic acids, esters of acrylic acids, preferably those containing from 2 to about 50 carbon atoms in the ester group, acrylic amides, and acrylonitriles. Especially preferred is wherein the styrenes comprise styrene and the acrylic monomer comprises at least one methacrylic acid ester, especially an aliphatic ester containing from 9 to about 23 carbon atoms in the ester groups.

The process of this invention is conducted to provide polymeric arms having weight average molecular weights ($\overline{M}_w$) ranging from about 1,000, more often from about 3,000, even more often from about 5,000 to about 500,000, often from about 10,000 to about 250,000 frequently up to about 25,000, frequently from about 3,000 to about 25,000, often up to about 15,000. In another embodiment, the resulting block copolymer has weight average molecular weight ranging from about 5,000 to about 250,000, often up to about 150,000, frequently up to about 100,000.

The molecular weight of a polymeric arm is the total of the molecular weights of the monomeric components, or for a block copolymer, the individual blocks. In a preferred embodiment, the $\overline{M}_w$ of the A-block ranges from about 4,000 to about 80,000 and the $\overline{M}_w$ of the B-block ranges from about 4,000 to about 80,000. Preferred A:B weight ratios are 1:1 up to 2:1, preferably up to about 1.5:1. Molecular weights of the B-block and of third blocks are determined by subtracting the molecular weight of the A-block or for polymers containing more than two blocks, the total molecular weight of the previously prepared blocks, from the total molecular weight of the polymer.

As noted hereinabove, the block copolymeric arms of this invention may comprise a third block. When the block copolymer is a triblock copolymer, the molecular weight of the third block typically ranges from about 4,000 to about 80,000.

Specific molecular weights of polymeric arms are frequently dictated by the intended use. For the copolymers of this invention, when the polymer is intended to be used in gear lubricants, preferred $\overline{M}_w$ for each block range from about 5,000 to about 20,000, preferably up to about 12,000, with the preferred A-block to B-block $\overline{M}_w$ ratio of about 1–1.4:1. For use in hydraulic oils and in automatic transmission fluids, typical molecular weights range from about 10,000 to about 30,000, preferably up to about 20,000. For engine oils, for example for gasoline passenger car engines and for heavy duty diesel engines, the molecular weight for each block frequently ranges from about 40,000 to about 100,000, often up to about 80,000.

Molecular weights of the polymers are determined using well known methods described in the literature. Examples of procedures for determining the molecular weights are gel permeation chromatography (GPC) (also known as size-exclusion chromatography), light scattering, and vapor phase osmometry (VPO). The GPC technique employs standard materials against which the samples are compared. For best results, standards that are chemically similar to those of the sample are used. For example, for polystyrene polymers, a polystyrene standard, preferably of similar molecular weight, is employed. When standards are dissimilar to the sample, generally relative molecular weights of related polymers can be determined. For example, using a polystyrene standard, relative, but not absolute, molecular weights of a series of polymethacrylates may be determined. These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modern Size Exclusion Liquid Chromatography", John Wiley and Sons, New York, 1979.

Radial polymers of this invention may be prepared by reacting the foregoing polymeric compositions with a coupling agent comprising a polyfunctionqal monomer. As noted above, the arms of the radial polymer may be substantially the same or may be different.

When the arms are substantially the same, the coupling agent is reacted with stabilized polymers that are substantially the same, that is, all the same homopolymer or copolymeric composition.

When the arms are different, the coupling agent may be reacted with a mixture of different stabilized monomers.

The Coupling Agent

A variety of coupling agents are useful for preparing the radial polymers of this invention. The coupling agents are polyfunctional monomers. The polymeric, stabilized free radical sites can add to one of the polymerizable vinyl groups of the coupling agent, then the adduct can undergo further polymerization through the remaining sites to form a radial polymer.

Examples of useful coupling agents include divinyl benzene, glycol bis-acrylates or methacrylates, polyol acrylates and methacrylates, and alkylene bis-acrylamides.

While not wishing to be bound by theory, it is proposed that the radial polymers of this invention are formed by a stepwise process:

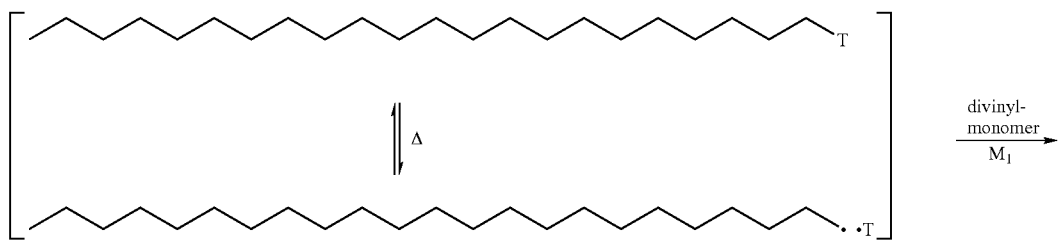

-continued

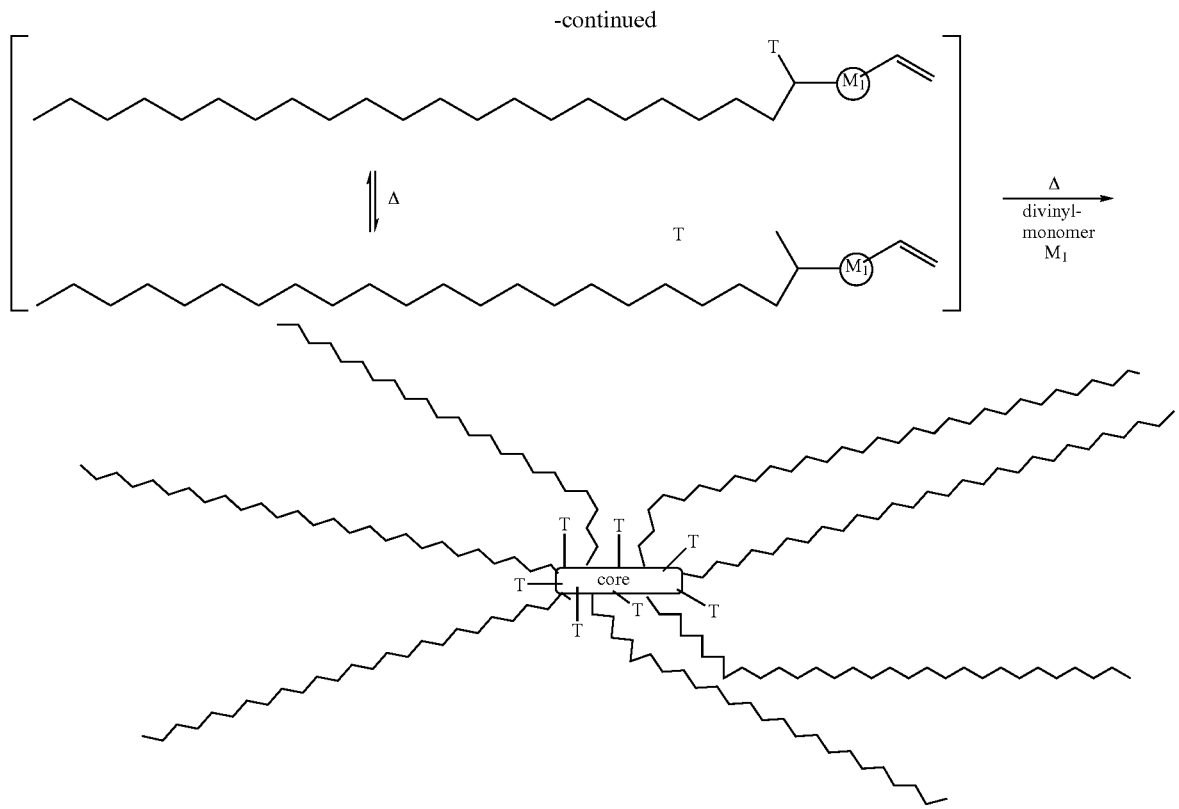

where T=stabilizing agent. It is also believed that individual radial polymers can couple to form very high molecular weight polymers.

The following examples are intended to illustrate several compositions of this invention as well as means for preparing same. Parts in the following examples are, unless otherwise indicated, parts by weight. The amounts shown are sometimes expressly indicated as parts by weight (pbw) or parts by volume (pbv). The relationship between parts by weight and parts by volume is as grams to milliliters. Temperatures are in degrees Celsius (° C.). Filtrations employ a diatomaceous earth filter aid. Molecular weight and polydispersity (PDI) values are determined using GPC. In several examples, the extent of conversion is determined during processing. Conversions are determined by taking an aliquot from the reaction mixture, precipitating polymer from the aliquot using methanol, and calculating the % of monomer converted to polymer. Molecular weight values for these in-process samples are obtained using GPC, with polystyrene standard, employing two 500 mm×10 mm columns in tandem, a Jordi-Gel Mixed Bed, Catalog # 15005, and a Jordi-Gel 500 A°, provided by Jordi Associates, Bellingham Mass., USA. Values for the products of the examples are generated using GPC, with polystyrene standard, employing in tandem, four 300 mm×7.5 mm columns obtained from Polymer Laboratories Inc., Amherst, MA, USA, consisting of three PLgel mixed bed C; 5 µm, catalog # 1110–6500 columns and one PLgel 100 A°, catalog # 1210–6120 column.

EXAMPLE 1A

A resin kettle is charged with 195 parts styrene, 1.17 part TEMPO, 1.51 part benzoyl peroxide, 0.60 part camphor sulfonic acid and 105 parts $C_{12-15}$ methacrylate. The materials are mixed, under $N_2$ then heated to 130° C. After 7 hours the materials are cooled to 80° C. whereupon 500 parts by volume toluene are added. The materials are precipitated, from 4000 parts by volume methanol. The thick, sticky product is dried in vacuo at 80° C. $\overline{M}_n$=56,578, $\overline{M}_w$=73,366, using polymethacrylate standard.

EXAMPLE 1B

A reactor is charged with 5 parts of the product of part A of this example, 2 parts ISOPAR® L (a branched alkane sold by Exxon Chemical Co) and 0.94 part divinyl benzene. The materials are heated at 130° C. for 5 hours under $N_2$. An aliquot at this point shows ~20% peak molecular weight by GPC (Mp)=80,000. After 7 more hours at 130° C. an aliquot shows 42% is Mp~214,000. After 7 more hours, an aliquot shows 48% with Mp~260,000. The remaining materials are diluted with 10 parts by volume toluene and are precipitated from 200 parts by volume methanol $M_p$ (GPC, Polystyrene standard), 47.7% 258,941; 52.30% 28,241.

EXAMPLE 2A

A reactor is charged with 600 parts of styrene, 6.25 parts TEMPO, 8.07 parts benzoyl peroxide and 1.20 parts camphor sulfonic acid. The materials are mixed at 130° C. for 5 hours. At this point analysis of an aliquot precipitated from methanol and dried indicates ~50% conversion. The mixture is cooled and diluted with 400 parts by volume toluene and is precipitated from 4000 parts by volume methanol. GPC analysis: A) Polymethacrylate standard: $\overline{M}_n$=17,887, $\overline{M}_w$=20,077; (B) Polystyrene standard: $\overline{M}_n$=25,804, $\overline{M}_w$=30,018 and $M_p$=31,072.

EXAMPLE 2B

A reactor is charged with 5 parts of the product of example 2A and 2 parts divinyl benzene. The materials are heated to 130° C. and are maintained there for 1 hour at which time the materials are too thick to stir with the apparatus. The materials are diluted with 10 parts by volume toluene and precipitated from 100 parts by volume methanol. GPC: multimodal, with peak molecular weights at 240,000; 148,000; 71,000; and 33,531.

EXAMPLE 3A

A resin kettle charged with 210 parts styrene, 2.08 parts TEMPO, 0.95 part 2-fluoro-1-methylpyridinium para-toluenesulfonate, and 2.69 parts benzoyl peroxide is heated to 135° C. under N2, followed by heating for 5.25 hours, obtaining % conversion vs. time as follows:

| Time | % Conversion | $\overline{M}_n$ | $\overline{M}_w$ | PDI |
| --- | --- | --- | --- | --- |
| 2 hr | 27 | — | — | — |
| 3 hr | 49 | — | — | — |
| 4 hr | 57 | — | — | — |
| 5 hr | 67 | — | — | — |
| 5.25 hr | 74 | 8,235 | 16,387 | 1.99 |

To the batch are added 0.8 part camphorsulfonic acid and 190 parts $C_{12-15}$ methacrylate, followed by stirring for 2 hours at 135° C. The batch is diluted with 400 parts toluene, stirred for 0.2 hour then precipitated into a 5-fold volume of a 2:1 mixture of methanol and propanol. The precipitate is washed with isopropanol then with methanol and dried in vacuo. Employing Polymer Laboratories columns, Mp=42,043.

EXAMPLE 3B

A reactor is charged with 5.5 parts of the product of part A of this example, and 1.04 part divinyl benzene in 2.2 parts Isopar-L, then the materials are heated to 100° C. Camphorsulfonic acid (0.076 part) is added, the temperature is increased to 150° C. and is maintained. After 0.5 hour, an additional 2 parts Isopar-L are added, heating is continued for 0.5 hour then an additional 1 part Isopar-L is added. After an additional 1.5 hour, 0.038 part camphorsulfonic acid is added and after 2.5 more hours an additional 0.038 part camphorsulfonic acid and 1.5 part Isopar-L are added. Heating is continued for 2 hours, then 10 parts by volume toluene are added and the polymer is precipitated from 100 parts by volume methanol. GPC: Bimodal: $M_p$=(7.4%)=378, 399, (92.6%)=41,914.

EXAMPLE 4A

A resin kettle is charged with a mixture of 125 parts styrene, 175 parts $C_{12-15}$ methacrylate, 1.2 parts TEMPO, 0.60 parts camphorsulfonic acid and 1.86 parts benzoyl peroxide. The kettle is immersed in an oil bath at 133° C. and is stirred, under $N_2$, for 4.5 hour. The temperature is increased to 143° C. and 0.36 part t-butyl peroxide is added. After stirring at 143° C. for 1.5 hour, an additional 0.36 part t-butyl peroxide is added and the materials are stirred at 143° C. for 1.5 hours. The materials are then mixed with 75 parts mineral oil (Petro-Canada 65N, 100% saturated). $\overline{M}_n$=30975, $\overline{M}_w$=41274, $M_p$=40196. TE (5% by weight neat polymer in partial synthetic base oil (5% Risella G-07, 85% mineral oil (Exxon 100N), 10% di-2-ethylhexyl azelate) =3.98.

EXAMPLE 4B

A resin kettle is charged with 50.0 parts of the product of Example 4A and 8 parts divinylbenzene. The kettle is immersed in an oil bath at 133° C. and is stirred, under $N_2$, for 2.5 hour. At this time, 6 parts hydrotreated naphthenic oil (Risella G-07, 40N) and the mixture is stirred for 1 hour at 143° C. followed by the addition of 44 parts Risella G-07 oil and mixing for 1 hour at 100° C. $\overline{M}_n$=42305, $\overline{M}_w$=427207, $M_p$=35787; 413203; 2329711. TE (5% by weight neat polymer in partial synthetic base oil (5% Risella G-07, 85% mineral oil (Exxon 100N), 10% di-2-ethylhexyl azelate) =11.1.

EXAMPLE 5A

A resin kettle is charged with a mixture of 158 parts styrene, 142 parts $C_{12-15}$ methacrylate, 1.2 parts TEMPO, 0.3 parts camphorsulfonic acid and 1.86 parts benzoyl peroxide. The kettle is immersed in an oil bath at 133° C. and is stirred, under $N_2$, for 4.5 hour. The temperature is increased to 143° C. and 0.3 parts each of camphor sulfonic acid and t-butyl peroxide are added. After stirring at 143° C. for 1 hour, an additional 0.3 part t-butyl peroxide is added and the materials are stirred at 143° C. for 1.5 hours. The materials are then mixed with 75 parts Risella G-07 mineral oil and mixed for 0.25 hour. $\overline{M}_n$=24456, $\overline{M}_w$=42079, $M_p$=32498. TE (8% by weight neat polymer in mineral oil (Exxon 100N))=9.7.

EXAMPLE 5B

A resin kettle is charged with 50.0 parts of the product of Example 5A and 8 parts divinylbenzene. The kettle is immersed in an oil bath at 133° C. and is stirred, under $N_2$, for 2.5 hour. Heating is increased to 143° C. over 0.5 hour, and the temperature is maintained, with stirring, for 3.5 hour. Near the end of this time, the viscosity is increasing rapidly and the materials are climbing up the stirrer shaft. Hydrotreated naphthenic oil (Risella G-07, 40N), 50 parts is added and the mixture is stirred for 0.5 hour as it cools to 110° C. $\overline{M}_n$=19346, $\overline{M}_w$=139674, $M_p$=30043; 392437; 1362352. TE (4% by weight neat polymer in mineral oil (Exxon 100N))=9.7.

The Oil of Lubricating Viscosity

The lubricating compositions and methods of this invention employ an oil of lubricating viscosity, including natural or synthetic lubricating oils and mixtures thereof. Mixtures of mineral oil and synthetic oils, particularly polyalphaolefin oils and polyester oils, are often used.

Natural oils include animal oils and vegetable oils (e.g. castor oil, lard oil and other vegetable acid esters) as well as mineral lubricating oils such as liquid petroleum oils and solvent-treated or acid treated mineral lubricating oils of the paraffinic, naphthenic or mixed paraffinic-naphthenic types. Hydrotreated or hydrocracked oils are included within the scope of useful oils of lubricating viscosity. Hydrotreated naphthenic oils are well known. Oils of lubricating viscosity derived from coal or shale are also useful.

Synthetic lubricating oils include hydrocarbon oils and halosubstituted hydrocarbon oils such as polymerized and interpolymerized olefins, etc. and mixtures thereof, alkylbenzenes, diphenyl alkanes, polyphenyl, (e.g., biphenyls, terphenyls, alkylated polyphenyls, etc.), alkylated diphenyl ethers and alkylated diphenyl sulfides and their derivatives, analogs and homologues thereof and the like.

Alkylene oxide polymers and interpolymers and derivatives thereof, and those where terminal hydroxyl groups have been modified by esterification, etherification, etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyols or polyether polyols.

Other synthetic lubricating oils include liquid esters of phosphorus-containing acids, polymeric tetrahydrofurans, alkylated diphenyloxides and the like.

Unrefined, refined and rerefined oils, either natural or synthetic (as well as mixtures of two or more of any of these) of the type disclosed hereinabove can used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

The lubricating oil compositions of the instant invention generally comprise a major amount of an oil of lubricating viscosity and a minor amount of the block copolymer of this invention. As is discussed in greater detail hereinafter, the lubricating oil compositions of this invention may contain minor amounts of other additives.

By major amount is meant more than 50% by weight. A minor amount is less than 50% by weight. The total amount of oil of lubricating viscosity in a lubricating oil composition of this invention constitutes a major amount. Thus, for example, when 2 or more oils of lubricating viscosity are employed in a lubricating oil composition of this invention, the total weight percent of the individual oils constitutes a major amount, i.e., more than 50% by weight of the lubricating oil composition.

Accordingly, all of the other components that are present in a lubricating oil composition of this invention will total less than 50% by weight of the lubrication oil composition, i.e., a minor amount.

Other Additives

As mentioned, the compositions of this invention may contain minor amounts of other components. The use of such additives is optional and the presence thereof in the compositions of this invention will depend on the particular use and level of performance required. Accordingly, these optional components may be included or excluded.

The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, metal passivating agents, pour point depressing agents, extreme pressure agents, anti-wear agents, color stabilizers and anti-foam agents. The abovementioned dispersants and viscosity improvers are used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbyl and trihydrocarbyl phosphites, molybdenum compounds, and the like.

Auxiliary viscosity improvers (also sometimes referred to as viscosity index improvers) may be included in the compositions of this invention. Viscosity improvers are usually polymers, including polyisobutenes, polymethacrylic acid esters, diene polymers, polyalkyl styrenes, alkenylarene-conjugated diene copolymers and polyolefins. Multifunctional viscosity improvers, other than those of the present invention, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,399,141 | 3,574,101 |
| 3,184,474 | 3,415,750 | 3,576,743 |
| 3,215,707 | 3,433,744 | 3,630,904 |
| 3,219,666 | 3,444,170 | 3,632,510 |
| 3,271,310 | 3,448,048 | 3,632,511 |
| 3,272,746 | 3,448,049 | 3,697,428 |
| 3,281,357 | 3,451,933 | 3,725,441 |
| 3,306,908 | 3,454,607 | 4,194,886 |
| 3,311,558 | 3,467,668 | 4,234,435 |
| 3,316,177 | 3,501,405 | 4,491,527 |
| 3,340,281 | 3,522,179 | 5,696,060 |
| 3,341,542 | 3,541,012 | 5,696,067 |
| 3,346,493 | 3,541,678 | 5,779,742 |
| 3,351,552 | 3,542,680 | RE 26,433 |
| 3,381,022 | 3,567,637 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents

| | |
|---|---|
| 3,329,658 | 3,666,730 |
| 3,449,250 | 3,687,849 |
| 3,519,565 | 3,702,300 |

The above-noted patents are incorporated herein by reference for their disclosures of ashless dispersants.

The above-illustrated other additives may each be present in lubricating compositions at a concentration of as little as 0.001% by weight usually ranging from about 0.01% to about 20% by weight, more often from about 1% to about 12% by weight. In most instances, they each contribute from about 0.1% to about 10% by weight.

Lubricating oil compositions contain block copolymers of the present invention in minor amounts, often amounts ranging from about 0.5% more often from about 1% up to about 29% by weight, more often from about 3% to about 10% by weight, even more often from about 5% to about 8% by weight.

Additive Concentrates

The various additives described herein can be added directly to the lubricant. Preferably, however, they are diluted with a substantially inert, normally liquid organic diluent such as mineral oil, naphtha, benzene, toluene or xylene, to form an additive concentrate. These concentrates usually comprise about 5 to about 95%, preferably from about 5 to about 50% by weight, often up to about 40% by weight of the radial polymers of this invention and may additionally contain, one or more other additives known in the art or described hereinabove. Concentrations such as 15%, 20%, 30% or 50% or higher may be employed.

It is often useful that viscosity improvers not only moderate the loss of viscosity as temperatures are increased, but also that low temperature performance is not adversely affected. Low temperature viscosity (Brookfield Viscosity) of fluid lubricants is determined using ASTM Procedure 2983, Standard Test Method for Low Temperature Viscosity of Automotive Fluid Lubricants Measured by Brookfield Viscometer, which appears in the Annual Book of ASTM Standards, Section 5, ASTM, Philadelphia, Pa., USA. This procedure employs a Brookfield Viscometer which is described in the procedure. The device is available from Brookfield Engineering Laboratories, Stoughton, Mass., USA.

Lubricating compositions are often subject to conditions that can result in shearing of the polymer, resulting in reduction of viscosity improving properties. Accordingly, shear stability of polymer containing blends is frequently important. Several tests are available to measure a compositions resistance to shear under conditions of high shear stress.

On one test, the polymer containing fluid is passed through the nozzle of a diesel injector as set forth in ASTM D-3945, Procedure A, except the fluid is subject to 250 passes.

Another useful test is the KRL Tapered Bearing Shear Test. This is a published standard test entitled "Viscosity Shear Stability of Transmission Lubricants" and is described in CEC L-i45-T93, available from CEC, 61 New Cavendish Street, London, WIM 8AR, England. The same test is published as DIN 51 350, part 6, and is available from Deutsches Institut für Normung, Burgerfenshase 6, 1000 Berlin 30, Germany. Both of these references are incorporated herein by reference.

It is known that some of the materials incorporated into additive concentrates and lubricating oil compositions may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A radial polymer comprising at least 3 polymeric arms and a central core comprising a polymerized di- or polyfunctional monomer, said polymer retaining an active radical polymerization site thereon; said polymer being prepared by a process comprising the steps:
   (a) polymerizing at an elevated temperature, a charge comprising at least one free radical-polymerizable monomer to prepare a stabilized active polymer block (A) using a free radical polymerization process, wherein a stable free radical agent is employed during the polymerization, thereby preserving the stabilized active polymerization site at the terminus of the polymer; and
   (b) optionally adding at least one additional free radical-polymerizable monomer, at least one of which is different from the monomers making up the first charge of monomers, to the stabilized active polymer block (A); and further reacting the mixture using a free radical process to effect copolymerization of said monomers, thereby preparing an A-B block copolymer having a stabilized active polymerization site at the terminus of the polymer; then
   (c) adding at least one coupling agent comprising a polyfunctional monomer and reacting the stabilized active polymers from (a) or (b) with the coupling agent to form a radial polymer.

2. The polymer of claim 1 in which the process therefor comprises step (b).

3. The polymer of claim 1 in which the process therefore employs only steps (a) and (c), and wherein, in step (a), the charge comprises at least two different monomers, whereby the resulting copolymer comprises random or alternating copolymer arms.

4. The polymer of claim 2 wherein an additional (A) block is incorporated by
   (e) after step (b) and before step (c), adding and polymerizing, at an elevated temperature, at least one additional monomer having the same composition as that charged to generate block (A).

5. The polymer of claim 2, wherein a (C) block is incorporated by:
   (f) after step (b) and before step (c) adding and polymerizing at an elevated temperature, at least one free radical-polymerizable monomer which is different from the monomers employed in steps (a)–(b).

6. The polymer of claim 1, wherein the polymer is a solid, and wherein the polymer is isolated as a substantially solvent-free dry polymer by stripping off diluent, if any, and volatile unreacted monomers, or by precipitation of the polymer into a solvent in which the polymer has limited solubility, which solvent selectively takes up unreacted monomer.

7. The polymer of claim 1 wherein the polyfunctional monomer of (c) comprises a divinyl benzene.

8. The polymer of claim 1 wherein the coupling agent in step (c) comprises a mixture of a divinylbenzene and a styrene.

9. The polymer of claim 2 wherein the ratio of the molecular weight of the A-block to molecular weight of the B-block is about 1:1 to about 1.4:1.

10. An additive concentrate for preparing lubricating oil compositions comprising from about 2% to about 95% by weight of the polymer of claim 1 and from 95% to about 2% by weight of a normally liquid organic diluent.

11. A lubricating oil composition comprising a major amount of an oil of lubricating viscosity and a minor amount of the polymer of claim 1.

12. A lubricating oil composition comprising a major amount of an oil of lubricating viscosity and a minor amount of the polymer of claim 2.

13. A lubricating oil composition comprising a major amount of an oil of lubricating viscosity and a minor amount of the polymer of claim 3.

14. A lubricating oil composition comprising a major amount of an oil of lubricating viscosity and a minor amount of the additive concentrate of claim 10.

* * * * *